United States Patent
Iwai et al.

(10) Patent No.: US 7,154,073 B2
(45) Date of Patent: Dec. 26, 2006

(54) MICROWAVE HEATABLE TRAY FOR FROZEN FOOD, PACKAGE OF FROZEN FOOD, PACKAGE OF FROZEN SUSHI, AND METHOD OF THAWING FROZEN SUSHI

(75) Inventors: Shuichi Iwai, Tokyo (JP); Nobuhiro Kobayashi, Tokyo (JP)

(73) Assignee: Kiyari Co., Ltd., Tokyo (JP)

( * ) Notice: Subject to any disclaimer, the term of this patent is extended or adjusted under 35 U.S.C. 154(b) by 0 days.

(21) Appl. No.: 11/319,741

(22) Filed: Dec. 29, 2005

(65) Prior Publication Data

US 2006/0118551 A1 Jun. 8, 2006

Related U.S. Application Data

(63) Continuation of application No. PCT/JP04/009337, filed on Jul. 1, 2004.

(30) Foreign Application Priority Data

Jul. 23, 2003 (JP) .............................. 2003-278419

(51) Int. Cl.
 *H05B 6/80* (2006.01)
 *A23L 3/365* (2006.01)
 *B65D 81/34* (2006.01)
 *A23L 1/01* (2006.01)

(52) U.S. Cl. ....................... 219/730; 219/729; 219/762; 99/DIG. 14; 426/113; 426/234; 426/241

(58) Field of Classification Search ........ 219/725–735, 219/759, 762; 99/DIG. 14; 426/107, 109, 426/113, 234, 241, 243
See application file for complete search history.

(56) References Cited

U.S. PATENT DOCUMENTS 5,343,024 A * 8/1994 Prosise et al. .............. 219/730

FOREIGN PATENT DOCUMENTS

| JP | 02-309130 | 12/1990 |
|----|-----------|---------|
| JP | 05-126343 | 5/1993 |
| JP | 8-180790 | 7/1996 |
| JP | 9-98888 | 4/1997 |
| JP | 09-249269 | 9/1997 |
| JP | 10-210960 | 8/1998 |
| JP | 11-8058 | 1/1999 |
| JP | 11-251054 | 9/1999 |
| JP | 11-307239 | 11/1999 |
| JP | 2002-223711 | 8/2002 |
| JP | 2004-097179 | 4/2004 |

* cited by examiner

*Primary Examiner*—Philip H. Leung
(74) *Attorney, Agent, or Firm*—Manabu Kanesaka (57) ABSTRACT

The present invention provides a tray for frozen food enabling frozen food such as frozen sushi on the tray to be suitably thawed and to provide a frozen food package or a frozen sushi package using this tray, and a method of thawing frozen sushi in this package. The tray for frozen food 1 comprises a base 3, concavities 2 caved in the base 3, a surrounding wall 4 standing from the periphery of the base 3, a flange 5 composing the top end of the surrounding wall 4, a downward flap 6 extending downwardly from the outer peripheral edge of the flange 5, an overhanging portion 7 overhanging outward from the lower edge of the downward flap 6, ribs 8 formed at corners between the base 3 and the surrounding wall 4, and bulges 9 standing from the base 3. The tray 1 is composed of a body 1a made of a synthetic resin and a dielectric material layer 1b formed on the outer surface of the body 1a. Frozen sushi 10 is disposed such that the shari ball 11 is entirely or mostly positioned within the concavity 2 and the neta 12 is entirely positioned above the level of the base 3. The frozen sushi is thawed in such a manner that the shari ball 11 is thawed with heat transmitted from the dielectric material layer 1b by heating the frozen food package by a microwave oven and the neta 12 is thawed with heat transmitted from the shari ball 11 after stopping heating the package in the microwave oven.

14 Claims, 4 Drawing Sheets

MICROWAVE HEATABLE TRAY FOR FROZEN FOOD, PACKAGE OF FROZEN FOOD, PACKAGE OF FROZEN SUSHI, AND METHOD OF THAWING FROZEN SUSHI

CROSS REFERENCE TO RELATED APPLICATION

This is a continuation application of PCT/JP2004/009337 filed on Jul. 1, 2004.

FIELD OF THE INVENTION

The present invention relates to a tray for accommodating frozen food, a frozen food package or a frozen sushi package using this tray, and a method of thawing frozen sushi.

BACKGROUND OF THE INVENTION

The technologies to thaw frozen sushi with microwave of, for example, a microwave oven have been disclosed in Japanese Patent Publication (JP) 8-180790A, JP 9-98888A, JP 10-210960A, JP11-8058A, JP 11-251054A, JP 11-307239A, and JP 2002-223711A.

Any of the known technologies is placing frozen sushi on a disc-like thawing panel and irradiating it with microwave.

It is desired to thaw frozen sushi such that "shari" (a ball of vinegared rice) is moderately warm and "neta" (a slice of fish or other ingredient) is cold.

In the aforementioned conventional technologies, the intensity distribution of microwave is controlled to heat the shari rather than the neta with microwave. However, it is not easy to thaw frozen sushi on the thawing panel always to have moderately warm shari and cold neta. Inconveniently, neta is sometimes also warm.

SUMMARY OF THE INVENTION

It is an object of the present invention to provide a tray for frozen food enabling frozen food such as frozen sushi on the tray to be suitably thawed and to provide a frozen food package or a frozen sushi package using this tray, and a method of thawing frozen sushi in this package.

A tray for frozen food of the present invention has a tray body having at least one concavity for accommodating frozen food, and a dielectric material layer. The layer is provided at least on the concavity, and absorbs microwave to generate heat.

A frozen food package of the present invention has a tray for frozen food of the present invention, frozen food accommodated in a concavity (-ties) of the tray, and a microwave-blocking film for sealing the upper face of the tray.

A frozen sushi package of the present invention has the above-described tray for frozen food, frozen sushi accommodated in at least one concavity of the tray, and a microwave-blocking film for sealing the upper face of the tray. Each sushi has a shari ball and a neta on the shari ball, and at least most of the shari ball is positioned within the concavity and the neta is positioned above the concavity.

According to a method of thawing frozen sushi of the present invention, frozen sushi is thawed by heating the frozen sushi package in a microwave oven. The shari ball is thawed with heat transmitted from the tray, and the neta is thawed with heat transmitted from the shari ball after stopping heating the package in the microwave oven.

BRIEF DESCRIPTION OF DRAWINGS

FIG. 6b is an enlarged view of a VIb portion of FIG. 6a;

DETAILED DESCRIPTION OF THE PREFERRED EMBODIMENTS

A frozen food package or a frozen sushi package using a tray for frozen food of the present invention can be irradiated with microwave to thaw frozen food or frozen sushi.

A dielectric material layer of the tray absorbs microwave to generate heat and the heat is transmitted to the frozen food, thereby thawing the frozen food. This heat is transmitted to the frozen food mainly by heat transmission from the bottom of each concavity and by radiation from the sides of the concavity or convection through layers of air between the sides of the concavity and the frozen food. The frozen food is heated as wrapped with heat from the bottom and the sides, thereby preventing or inhibiting the frozen food from being unevenly thawed.

The tray for frozen food of the present invention preferably has a base, a plurality of aforementioned concavities which are caved in the base, and a surrounding wall standing from the peripheral edge of the base. Therefore, a frozen sushi can be disposed such that the shari ball is positioned within a concavity and the neta is positioned above the concavity. With this position, the frozen sushi can be thawed to have moderately warm shari and cold neta.

The dielectric material layer is preferably arranged on the outer surface of the tray body in order to avoid contact with food. Since the surface of the dielectric material layer is rough-textured as compared to the surface of plastic product, the provision of the dielectric material layer on the outer surface of the tray body exhibits a secondary effect of helping user's grasp.

In order to uniformly form the dielectric material layer, the dielectric material layer is preferably formed by applying coating compound containing powder of the dielectric material. However, the forming method of the dielectric material layer is not limited thereto.

In the tray of the present invention, it is preferable to provide the dielectric material layer on the outer surfaces of the concavity, the base, and the surrounding wall. Accordingly, the tray generates heat from substantially the entire area thereof, thereby preventing the local penetration of microwave to the inside of the tray and preventing the frozen food from being locally heated hard.

In the tray for frozen food of the present invention, it is preferable that the top edge of the surrounding wall is a flange extending outward. A film for covering the tray can be attached to the flange.

The tray is provided with bulges standing from the base to the level substantially the same as the flange, whereby the film is supported by the bulges. Therefore, the film is prevented from being torn even if the film is pushed and the film is prevented from coming in contact with the frozen food.

The film preferably has a metallic layer for blocking the microwave, especially preferably has an aluminum layer of 10 µm or more in thickness.

According to the frozen sushi package of the present invention, as mentioned above, the shari ball positioned within the concavity is subjected to most of heat from the tray so that the temperature of the shari ball rises fast as compared to the neta and the thawing progresses. Since the neta is positioned above the concavity, the neta is subjected directly to little heat from the tray so that the neta is thawed slowly as compared to the shari ball, thereby making the neta colder than the shari ball.

To thaw frozen sushi, it is preferable to thaw the shari ball with heat transmitted from the tray by activating a microwave oven, then stop the microwave oven, and thaw the neta with heat transmitted from the shari ball. While the heat is transmitted from the shari ball to the neta, the temperature distribution in the shari ball is uniformed.

Hereinafter, an embodiment of the present invention will be described with reference to the drawings.

Figure 6A:
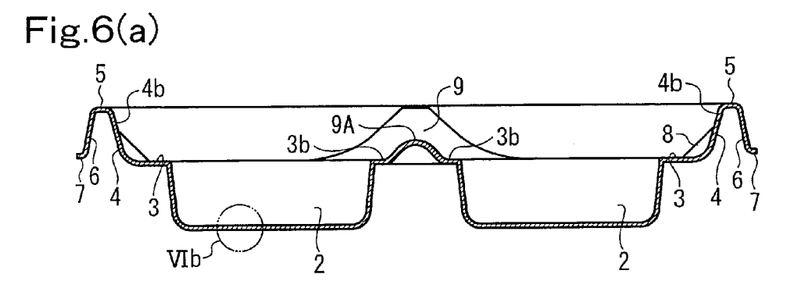
FIG. 6a is a sectional view taken along the line VIa–VIa of FIG. 2
Figure 6B:
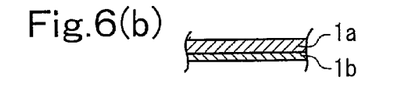
Figure 7:
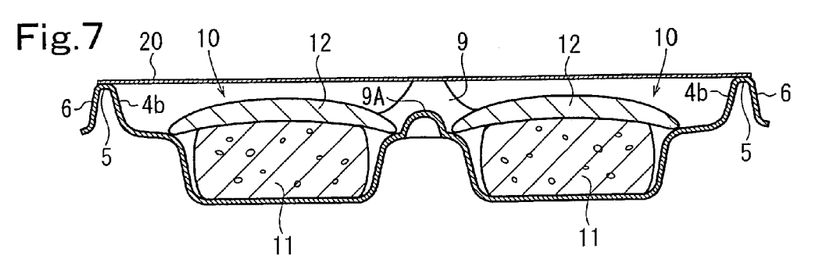
FIG. 7 is a vertical sectional view showing a frozen sushi package.
Figure 8:
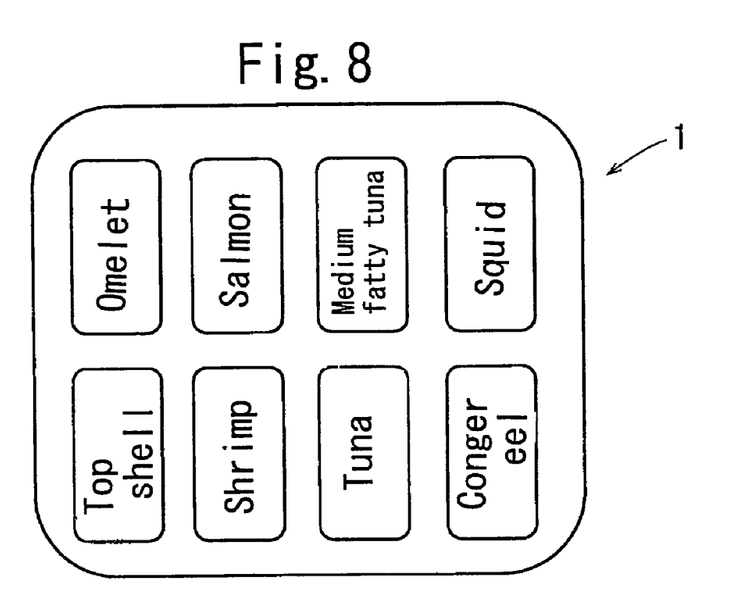
FIG. 8 is a plan view showing an arrangement of frozen sushi according to an example.

FIGS. 1 through 7 show a tray for frozen food according to an embodiment of the present invention and FIG. 8 is a plan view showing an arrangement of frozen sushi according to an example.

The tray for frozen food (hereinafter, sometimes referred to as just "tray") 1 comprises a base 3, concavities 2 caved in the base 3, a surrounding wall 4 standing from the periphery of the base 3, a flange 5 composing the top end of the surrounding wall 4, a downward flap 6 extending downwardly from the outer peripheral edge of the flange 5, an overhanging portion 7 overhanging outward from the lower edge of the downward flap 6, ribs 8 formed at corners between the base 3 and the surrounding wall 4, and bulges 9 standing from the base 3.

Figure 1:
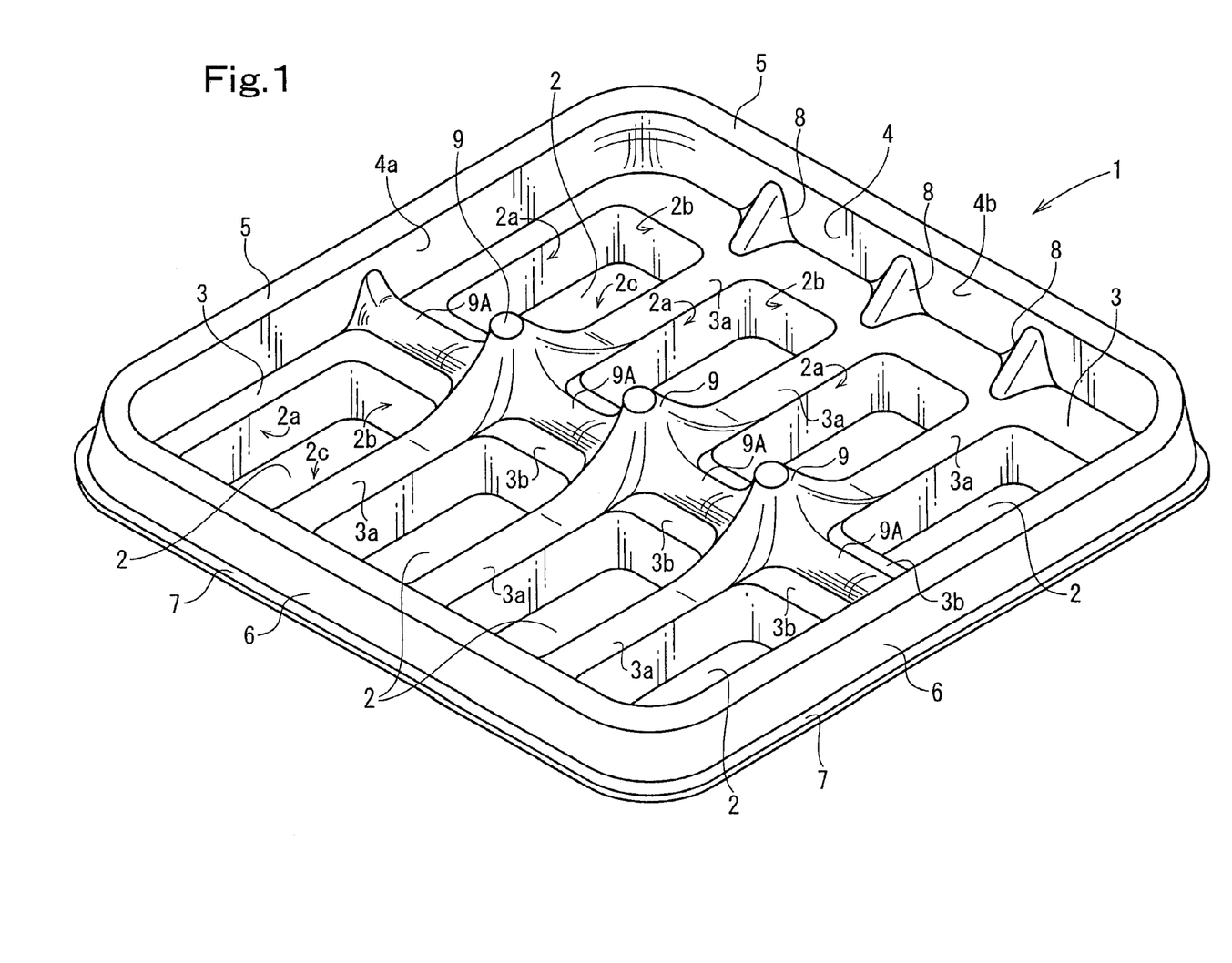
FIG. 1 is a perspective view showing a tray for frozen food according to an embodiment of the present invention.
Figure 2:
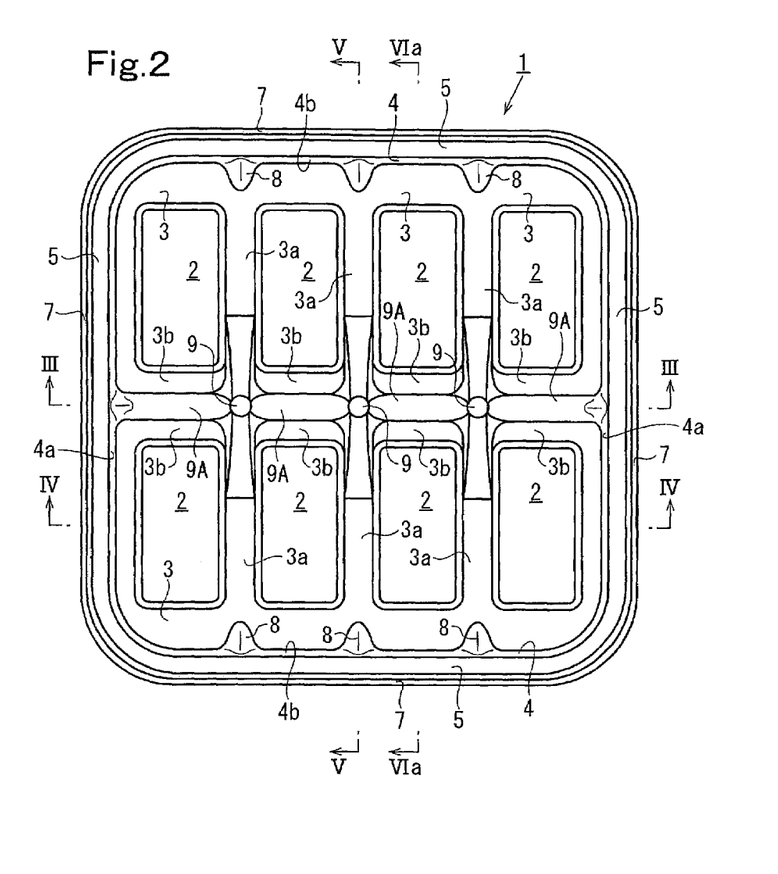
FIG. 2 is a plan view of the tray according to the embodiment of the present invention.
Figure 3:
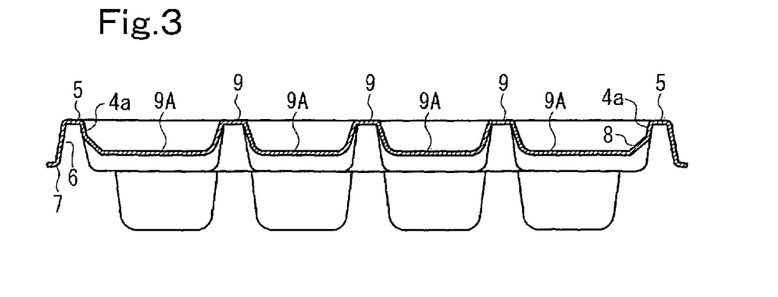
FIG. 3 is a sectional view taken along the line III—III of FIG. 2.
Figure 4:
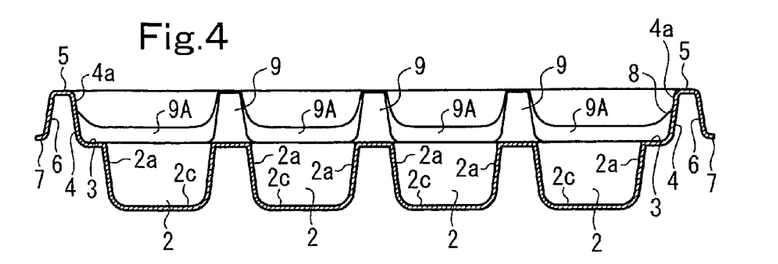
FIG. 4 is a sectional view taken along the line IV—IV of FIG. 2.
Figure 5:
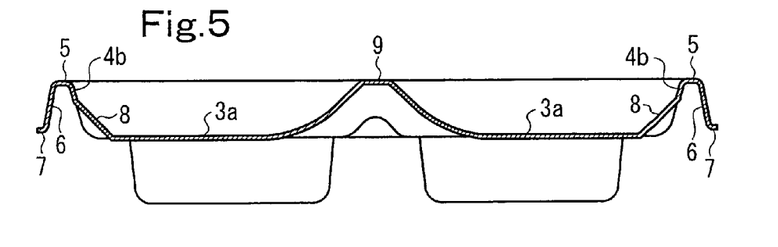
FIG. 5 is a sectional view taken along the line V—V of FIG. 2.

Each of the concavities 2 has a substantially rectangular shape as seen in plan view and comprises lengthwise side walls 2a, crosswise side walls 2b, and a bottom 2c. The concavities 2 are aligned to form two lines each consisting four concavities 2 such that the lengthwise side walls are parallel to each other, that is, eight concavities are arranged lengthwise and crosswise. It should be noted that the number of the concavities 2 is not limited thereto. The number of the concavities may depend on the size of the tray 1.

The concavity 2 is designed to have a size capable of accommodating a shari ball of frozen sushi. The corners between the side walls 2a, 2b are all smoothly curved.

The tray 1 is preferably designed to have a size capable of entering into a commercial or household microwave oven.

The base 3 is substantially square and has a frame-like shape. Four corners along the surrounding wall 4 are curved in arc-shape.

Portions of the base 3 between the lengthwise side walls 2a, 2a of the adjacent concavities 2, 2 are band-like portions 3a extending along the side walls 2a, 2a.

Portions of the base 3 between the crosswise side walls 2b, 2b of the adjacent concavities 2, 2 extend along the side walls 2b, 2b.

The surrounding wall 4 is provided to extend all around the peripheral edge of the base 3. The surrounding wall 4 comprises walls 4a parallel to the lengthwise side walls 2a of the concavities 2 and walls 4b parallel to the crosswise side walls 2b. The aforementioned ribs 8 are disposed at the corners between the walls 4b of the surrounding wall 4 and the base 3.

The flange 5 composes the upper end surface of the surrounding wall 4 and is provided to extend all around the surrounding wall 4 and to extend outward. The flange 5 is a flat surface to which a film 20 as will be described later is attached.

The downward flap 6 extending downward from the outer peripheral edge of the flange 5 is provided to extend all around the flange 5. The overhanging portion 7 overhangs outward from the lower edge of the downward flap 6. The overhanging length of the overhanging portion 7 is extremely small. The downward flap 6 and the overhanging portion 7 increase the rigidity of the tray 1 and facilitate user's fingers to catch the tray 1.

The bulges 9 are positioned at intersections of the band-like portions 3a, 3b. The tops of the bulges 9 are positioned at the same level as the top of the flange 5 and are flat so that the film 20 is supported by the tops of the bulges 9. The film 20 may be attached to the tops of the bulges 9. Each of the bulges 9 is formed in a substantial cone shape which is skewed in four directions, i.e. toward the band-like portions 3a, 3a, 3b, 3b.

Ribs 9A rise from the band-like portion 3b. Some of the ribs 9A which are provided between the bulges 9, 9 extend to connect the bulges 9, 9. The other ribs 9A extend to connect the bulges 9 and the walls 4a of the surrounding wall 4. The width of the rib 9A is smaller than the width of the band-like portion 3b so that the band-like portion 3b remains on the both sides of the rib 9A. The ribs 9A function to prevent neta from moving in the lengthwise direction of the concavities 2. The bulges 9 and the ribs 9A also increase the rigidity of the tray 1.

As shown in FIG. 6b, the tray 1 is composed of a body 1a made of a synthetic resin and a dielectric material layer 1b formed on the outer surface of the body 1a. The synthetic resin forming the tray body 1a may be polystyrene, but not limited thereto. The thickness of the tray body 1a is in a range of 100–1500 µm, preferably 300–800 µm, especially preferably 500–800 µm.

In this embodiment, the dielectric material layer 1b is formed on all outer surfaces of the tray 1, that is, formed on the outer surfaces of the bottoms 2c and the side walls 2a, 2b of the concavities 2, lower surfaces of the base 3, outer surfaces of the surrounding wall 4, lower surfaces of the flange 5, surfaces of the downward flap 6 facing the surrounding wall 4, lower surfaces of the overhanging portion 7, lower surfaces (rear faces) of the ribs 8, and lower surfaces (rear faces) of the bulges 9.

The dielectric material layer 1b may not be formed partially. For example, the dielectric material layer 1b may not be formed on the flange 5, the downward flap 6, and the overhanging portion 7. The thickness of the dielectric material layer 1b may be uniform entirely or may vary to have thick portions. For example, portions of the dielectric material layer 1b on the bottoms and the sides of the concavities 2 may be thicker than the other portions.

The dielectric material layer 1b is preferably formed by applying a coating compound, in which film-forming resin is dissolved and powder of the dielectric material is dispersed, on the outer surfaces of the tray body 1a in a manner such as spraying, brushing, or dipping to form a layer and then baking the layer. A preferable example of the dielectric material is ferrite. However, the dielectric material is not limited thereto. The thickness of the dielectric material layer 1b is in a range of 10–100 µm, preferably 10–80 µm, especially preferably 30–60 µm. The outer surface of the tray body 1a is preferably subjected to degreasing treatment prior to the formation of the coating.

Frozen sushi 10 is put into the concavity 2 of the tray 1 having the aforementioned structure and the tray 1 is sealed by the film 20, thereby forming a frozen sushi package.

The frozen sushi 10 has a shari ball 11 and a neta 12 on the shari ball 11. If desired, wasabi (Japanese horseradish) is interposed between the shari ball 11 and the neta 12. Examples of neta 12 include fishes such as salmon, fatty tuna, squid, octopus, shellfish, shrimp, and conger eel, processed foods thereof, and omelet, but not limited thereto.

As shown in FIG. 7, the frozen sushi 10 is disposed such that the shari ball 11 is entirely or mostly positioned within the concavity 2 and the neta 12 is entirely positioned above the level of the base 3. A tiny percent of the neta 12 may be positioned within the concavity 2. It is preferable that 90% or more, particularly 95% or more of the shari ball 11 is positioned within the concavity 2 (that is, under the base 3).

Normally, the shari ball of the frozen sushi is preferably in a range of 10–50 g, particularly 15–40 g, especially 18–25 g. The neta is preferably in a range of 3–40 g, particularly 5–30 g, especially 6–20 g.

The aforementioned film 20 has a base film made of a synthetic resin such as polyethylene and a metallic layer formed on the base film. The metallic layer is preferably an aluminum layer. The thickness of the aluminum layer is preferably 10 µm or more, particularly 12 µm or more, because the smaller the thickness is, the higher the transmission of microwave is, so that small thickness causes excessive rise of temperature of neta. For saving the cost, the thickness of the aluminum layer is preferably 100 µm or less, particularly 50 µm or less, especially 20 µm or less.

Though the frozen food is frozen sushi in the aforementioned description, the present invention can be applied to sweet stuffs and foodstuffs such as frozen cake, frozen rise bowl dishes, and frozen curried rice by changing the size and the number of concavities 2.

EXAMPLE

Hereinafter, a frozen sushi package using the aforementioned tray 1 and thawing example thereof will be explained.

A tray body 1a was 700 µm in thickness and made of polystyrene. A dielectric material layer 1b was 35 µm in thickness and made of a composite material of zinc oxide ferrite and acrylic resin. The content of ferrite in the composite material was about 80% by weight.

Dimensions of respective parts of a tray 1 were as follows:

| | |
|---|---|
| Length of one side of tray 1: | 210 mm |
| Height of surrounding wall 4: | 17 mm |
| Depth of concavity 2: | 20 mm |
| Size of concavity 2: upper portion: | 62 × 32 mm |
| lower portion: | 57 × 27 mm |

Total of eight concavities 2 of the tray 1 were filled with frozen sushi in the arrangement shown in FIG. 8 such that most of each shari ball 11 was positioned within each concavity 2 and each neta 12 was positioned above the base 3 as shown in FIG. 7. The weight of the shari ball 11 was 19g and the average weight of the neta 12 was 10 g.

A film 20 had a base film which was a polyethylene film of 12 µm in thickness and an aluminum layer of 15 µm in thickness. The film 20 was attached to the upper surface of the flange 5 by heat sealing.

This frozen sushi package was entered into a household microwave oven of 600 W output power, was heated for 2 minutes and 10 seconds, and was left for 3 minutes. In this manner, the frozen sushi was thawed. Experiment was conducted ten times. For each experiment, the temperatures (° C.) of shari ball and neta were measured. The results are shown in Tables 1–5.

TABLE 1

| | Experiment 1 | | | | Experiment 2 | | | |
| | Temperature of shari | | | | Temperature of shari | | | |
| Kind of neta | lower portion | middle portion | upper portion | Temperature of neta | lower portion | middle portion | upper portion | Temperature of neta |
|---|---|---|---|---|---|---|---|---|
| Omelet | 30 | 27 | 18 | 14 | 40 | 31 | 23 | 21 |
| Salmon | 28 | 16 | 8 | 2 | 35 | 19 | 7 | 2 |
| Medium fatty tuna | 27 | 14 | 6 | 1 | 32 | 14 | 9 | 2 |
| Squid | 45 | 38 | 22 | 19 | 48 | 36 | 20 | 14 |
| Top shell | 36 | 30 | 18 | 8 | 59 | 41 | 22 | 20 |
| Shrimp | 34 | 23 | 6 | 3 | 44 | 23 | 15 | 4 |
| Tuna | 31 | 21 | 7 | 1 | 39 | 20 | 10 | 3 |
| Conger eel | 46 | 43 | 28 | 23 | 51 | 40 | 31 | 17 |

TABLE 2

| | Experiment 3 | | | | Experiment 4 | | | |
| | Temperature of shari | | | | Temperature of shari | | | |
| Kind of neta | lower portion | middle portion | upper portion | Temperature of neta | lower portion | middle portion | upper portion | Temperature of neta |
|---|---|---|---|---|---|---|---|---|
| Omelet | 41 | 34 | 28 | 26 | 45 | 30 | 16 | 15 |
| Salmon | 38 | 22 | 11 | 4 | 44 | 22 | 4 | 3 |

TABLE 2-continued

| Kind of neta | Experiment 3 | | | | Experiment 4 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Medium fatty tuna | 39 | 20 | 10 | 5 | 41 | 19 | 4 | 5 |
| Squid | 53 | 32 | 32 | 22 | 53 | 37 | 10 | 7 |
| Top shell | 46 | 31 | 25 | 21 | 55 | 42 | 18 | 16 |
| Shrimp | 41 | 22 | 16 | 13 | 51 | 24 | 8 | 5 |
| Tuna | 48 | 23 | 9 | 3 | 51 | 25 | 8 | 2 |
| Conger eel | 54 | 42 | 30 | 27 | 53 | 41 | 22 | 21 |

TABLE 3

| Kind of neta | Experiment 5 | | | | Experiment 6 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Omelet | 54 | 38 | 18 | 17 | 36 | 31 | 17 | 15 |
| Salmon | 50 | 28 | 5 | 3 | 34 | 30 | 14 | 11 |
| Medium fatty tuna | 51 | 25 | 4 | 2 | 31 | 24 | 12 | 5 |
| Squid | 49 | 41 | 25 | 14 | 46 | 29 | 22 | 16 |
| Top shell | 45 | 30 | 15 | 11 | 45 | 30 | 20 | 17 |
| Shrimp | 43 | 23 | 12 | 7 | 27 | 23 | 15 | 11 |
| Tuna | 45 | 19 | 16 | 2 | 28 | 24 | 11 | 6 |
| Conger eel | 50 | 33 | 26 | 19 | 30 | 26 | 22 | 12 |

TABLE 4

| Kind of neta | Experiment 7 | | | | Experiment 8 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Omelet | 45 | 34 | 27 | 23 | 31 | 36 | 21 | 11 |
| Salmon | 35 | 14 | 6 | 3 | 39 | 25 | 10 | 5 |
| Medium fatty tuna | 34 | 19 | 13 | 10 | 38 | 24 | 14 | 10 |
| Squid | 41 | 33 | 24 | 19 | 46 | 31 | 19 | 16 |
| Top shell | 39 | 28 | 21 | 17 | 47 | 30 | 21 | 15 |
| Shrimp | 37 | 21 | 18 | 15 | 32 | 25 | 11 | 4 |
| Tuna | 34 | 19 | 10 | 6 | 34 | 31 | 13 | 10 |
| Conger eel | 40 | 34 | 27 | 25 | 37 | 32 | 16 | 14 |

TABLE 5

| Kind of neta | Experiment 9 | | | | Experiment 10 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Omelet | 59 | 40 | 16 | 15 | 49 | 36 | 21 | 24 |
| Salmon | 44 | 26 | 12 | 6 | 45 | 21 | 8 | 3 |
| Medium fatty tuna | 39 | 23 | 13 | 5 | 45 | 20 | 8 | 2 |
| Squid | 39 | 29 | 28 | 21 | 53 | 34 | 27 | 16 |
| Top shell | 41 | 27 | 22 | 19 | 39 | 23 | 16 | 15 |
| Shrimp | 32 | 20 | 9 | 7 | 38 | 21 | 15 | 8 |
| Tuna | 35 | 23 | 8 | 5 | 35 | 20 | 15 | 6 |
| Conger eel | 40 | 34 | 22 | 20 | 56 | 40 | 29 | 22 |

As shown in Tables 1–5, in any of the experiments, the frozen sushi could be thawed such that the shari ball is moderately warm and the neta is cold.

Next, the same frozen sushi package as used in the above was heated for 1 minute by a commercial microwave oven of 1400 W output power and was left for 3 minutes. In this manner, the frozen sushi was thawed. For each experiment, the temperatures (° C.) of shari ball and neta were measured. The results are shown in Tables 6–10.

TABLE 6

| Kind of neta | Experiment 11 | | | | Experiment 12 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Omelet | 31 | 22 | 20 | 15 | 36 | 30 | 26 | 21 |
| Salmon | 28 | 13 | 2 | 2 | 39 | 22 | 7 | 3 |
| Medium fatty tuna | 40 | 31 | 25 | 20 | 42 | 25 | 15 | 1 |
| Squid | 38 | 31 | 21 | 16 | 47 | 31 | 21 | 16 |
| Top shell | 40 | 31 | 19 | 18 | 36 | 19 | 5 | 2 |
| Shrimp | 35 | 22 | 15 | 12 | 30 | 14 | 13 | 13 |
| Tuna | 41 | 24 | 12 | 7 | 29 | 11 | 4 | 3 |
| Conger eel | 41 | 34 | 30 | 24 | 47 | 35 | 28 | 20 |

TABLE 7

| Kind of neta | Experiment 13 | | | | Experiment 14 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Omelet | 33 | 32 | 28 | 22 | 34 | 33 | 26 | 22 |
| Salmon | 33 | 20 | 15 | 10 | 32 | 34 | 15 | 9 |
| Medium fatty tuna | 33 | 21 | 16 | 10 | 30 | 22 | 17 | 10 |
| Squid | 38 | 31 | 25 | 20 | 38 | 29 | 24 | 21 |
| Top shell | 40 | 34 | 30 | 24 | 42 | 35 | 29 | 23 |
| Shrimp | 35 | 22 | 19 | 17 | 36 | 19 | 18 | 15 |
| Tuna | 34 | 16 | 8 | 0 | 31 | 15 | 9 | 3 |
| Conger eel | 45 | 35 | 29 | 27 | 46 | 36 | 27 | 25 |

TABLE 8

| Kind of neta | Experiment 15 | | | | Experiment 16 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Omelet | 37 | 31 | 23 | 20 | 42 | 39 | 35 | 30 |
| Salmon | 40 | 21 | 9 | 3 | 37 | 32 | 17 | 16 |
| Medium fatty tuna | 40 | 23 | 15 | 2 | 25 | 20 | 8 | 5 |
| Squid | 43 | 33 | 18 | 14 | 40 | 29 | 22 | 20 |
| Top shell | 37 | 20 | 8 | 3 | 44 | 33 | 22 | 20 |
| Shrimp | 29 | 17 | 10 | 4 | 35 | 28 | 15 | 12 |
| Tuna | 28 | 13 | 4 | 2 | 37 | 28 | 11 | 5 |
| Conger eel | 45 | 28 | 26 | 19 | 47 | 30 | 22 | 12 |

TABLE 9

| Kind of neta | Experiment 17 | | | | Experiment 18 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Omelet | 44 | 35 | 29 | 26 | 47 | 35 | 28 | 21 |
| Salmon | 34 | 15 | 8 | 3 | 29 | 13 | 4 | 3 |
| Medium fatty tuna | 33 | 20 | 15 | 10 | 30 | 15 | 10 | 8 |
| Squid | 40 | 34 | 26 | 21 | 36 | 21 | 5 | 2 |
| Top shell | 38 | 30 | 24 | 19 | 45 | 31 | 20 | 15 |
| Shrimp | 36 | 23 | 20 | 16 | 41 | 25 | 15 | 2 |
| Tuna | 33 | 21 | 13 | 9 | 38 | 21 | 8 | 3 |
| Conger eel | 39 | 36 | 29 | 25 | 37 | 31 | 26 | 20 |

TABLE 10

| Kind of neta | Experiment 19 | | | | Experiment 20 | | | |
|---|---|---|---|---|---|---|---|---|
| | Temperature of shari | | | | Temperature of shari | | | |
| | lower portion | middle portion | upper portion | Temperature of neta | lower portion | middle portion | upper portion | Temperature of neta |
| Omelet | 47 | 32 | 22 | 11 | 42 | 34 | 30 | 24 |
| Salmon | 35 | 26 | 15 | 12 | 41 | 24 | 12 | 6 |
| Medium fatty tuna | 37 | 31 | 11 | 5 | 35 | 22 | 12 | 11 |
| Squid | 44 | 35 | 22 | 18 | 40 | 30 | 19 | 17 |
| Top shell | 39 | 29 | 22 | 20 | 37 | 30 | 21 | 15 |
| Shrimp | 28 | 20 | 5 | 4 | 41 | 31 | 24 | 18 |
| Tuna | 37 | 27 | 15 | 10 | 28 | 14 | 3 | 2 |
| Conger eel | 42 | 40 | 35 | 29 | 31 | 22 | 20 | 16 |

As shown in Tables 6–10, in any of the experiments this time again, the frozen sushi could be thawed properly such that the shari ball is moderately warm and the neta is cold.

As the same experiment was conducted with a package in which, the thickness of the dielectric material layer 1b was half and the thickness of the aluminum layer was 9 μm, overheating called "boiled" occurs in salmon, shrimp, and medium fatty tuna in four in ten. From this, it was recognized that proper thawing is achieved by setting the aluminum layer and the dielectric material layer to have certain thicknesses.

The invention claimed is:

1. A tray for frozen food comprising:
   a tray body having at least one concavity for accommodating frozen food,
   a dielectric material layer which is provided at least on the concavity so as to absorb microwave to generate heat,
   wherein the tray body has a base, a plurality of said concavities which are caved in the base, a surrounding wall standing from a peripheral edge of the base, and bulges standing upward from portions between the concavities, tops of the bulges and top of said surrounding wall having flat surfaces and being located on a same level,
   wherein each of the concavities comprises lengthwise side walls, crosswise side walls, and a bottom, and the concavities are aligned lengthwise and crosswise such that spaces are formed between the lengthwise side walls and spaces are formed between the crosswise side walls, and
   a microwave-blocking film for sealing an upper face of the tray body, which is configured to contact the bulges and the top of the surrounding wall to prevent tearing of the film and prevent the film from coming into contact with the frozen food, respectively, when pushed.

2. A tray for frozen food as claimed in claim 1, wherein ribs are formed between the crosswise side walls of the adjacent concavities.

3. A tray for frozen food as claimed in claim 2, wherein the height of the ribs is lower than that of said surrounding wall.

4. A tray for frozen food as claimed in claim 1, wherein the dielectric material layer is provided on the outer surface of the tray body.

5. A tray for frozen food as claimed in claim 1, wherein the dielectric material layer is provided on outer surfaces of the concavities, the base, and the surrounding wall.

6. A tray for frozen food as claimed in claim 1, wherein the top edge of the surrounding wall is a flange extending outward.

7. A tray for frozen food as claimed in claim 1, wherein the dielectric material layer includes coating compound containing powder of dielectric material.

8. A tray for frozen food as claimed in claim 7, wherein the powder of the dielectric material is powder of ferrite.

9. A tray for frozen food as claimed in claim 1, wherein the thickness of the dielectric material layer is 10–100 μm.

10. A frozen sushi package comprising:
    the tray for frozen food as claimed in claim 1, frozen sushi accommodated in at least one concavity of said tray, and the microwave-blocking film for sealing the upper face of the tray, each sushi having a shari ball and a neta on the shari ball, at least most of the shari ball being positioned within the concavity, and the neta being positioned above the concavity.

11. A frozen sushi package as claimed in claim 10, wherein the microwave-blocking film comprises a base film made of a synthetic resin and a metallic layer formed on the base film.

12. A frozen sushi package as claimed in claim 11, wherein the metallic layer is an aluminum layer having a thickness of 10 µm or more.

13. A method of thawing frozen sushi by heating the frozen sushi package as claimed in claim 10 in a microwave oven, wherein the shari ball is thawed with heat transmitted from the tray, and the neta is thawed with heat transmitted from the shari ball after stopping heating said package in the microwave oven.

14. A method of thawing frozen sushi by heating the frozen sushi package as claimed in claim 10 in a microwave oven, wherein the neta is disposed directly on the shari without interposition of a separating film therebetween.

* * * * *